United States Patent
Kimura et al.

(10) Patent No.: US 12,258,091 B2
(45) Date of Patent: Mar. 25, 2025

(54) HEADLIGHT DEVICE AND LEANING VEHICLE INCLUDING HEADLIGHT DEVICE

(71) Applicant: YAMAHA HATSUDOKI KABUSHIKI KAISHA, Iwata (JP)

(72) Inventors: Yumi Kimura, Shizuoka (JP); Takehiro Inoue, Shizuoka (JP)

(73) Assignee: YAMAHA HATSUDOKI KABUSHIKI KAISHA, Iwata (JP)

( * ) Notice: Subject to any disclaimer, the term of this patent is extended or adjusted under 35 U.S.C. 154(b) by 0 days.

(21) Appl. No.: 18/646,085

(22) Filed: Apr. 25, 2024

(65) Prior Publication Data
US 2024/0270341 A1 Aug. 15, 2024

Related U.S. Application Data

(63) Continuation of application No. 17/565,561, filed on Dec. 30, 2021, now abandoned, which is a
(Continued)

(30) Foreign Application Priority Data

Jul. 2, 2020 (WO) .................. PCT/JP2020/026028

(51) Int. Cl.
- *B62J 6/02* (2020.01)
- *B60Q 1/12* (2006.01)
- *B62J 6/023* (2020.01)

(52) U.S. Cl.
CPC ..................... *B62J 6/023* (2020.02)

(58) Field of Classification Search
CPC ..... B62J 6/02; B62J 6/022; B62J 6/023; B62J 6/024; B62J 6/056; B60Q 2300/00;
(Continued)

(56) References Cited

U.S. PATENT DOCUMENTS

2005/0270785 A1* 12/2005 Gropp ..................... B60Q 1/18
362/544
2013/0241414 A1* 9/2013 Ikeda ....................... B62J 6/023
315/82
(Continued)

FOREIGN PATENT DOCUMENTS

DE 102016214120 A1 2/2018
JP 2016064723 A 4/2016
(Continued)

OTHER PUBLICATIONS

Masanori Motoki et al., "Study on the visibility and discomfort glare of adaptive front lighting system (AFS) for motorcycle" Transactions of Society of Automotive Engineers of Japan. 2009, vol. 40, No. 4, pp. 1089-1094, DOI: 10.11351/jsaeronbun.40.1089, ISSN 1883-0811 (online), ISSN 0287-8321 (print).
(Continued)

*Primary Examiner* — Thai Pham
(74) *Attorney, Agent, or Firm* — Rabin & Berdo, P.C.

(57) ABSTRACT

A headlight device including a headlight configured to emit light frontward of a leaning vehicle to form a lower light beam, an upper central light beam, an upper left light beam and an upper right light beam, and a control device that controls light emission from the headlight without any user operation. The control device forms both the upper left and the upper right light beams while the leaning vehicle is traveling straight, and reduces a brightness of the upper left and upper right light beams, responsive to a vehicle being illuminated by the upper left and upper right light beams respectively, and forms the upper left and upper right light beams respectively while the leaning vehicle is turning left and right, and maintains the brightness of the formed upper left or upper right light beam regardless of whether any vehicle is illuminated by the upper left or upper right light beam.

12 Claims, 8 Drawing Sheets

Related U.S. Application Data continuation-in-part of application No. PCT/JP2020/026028, filed on Jul. 2, 2020.

(58) Field of Classification Search
CPC ............ B60Q 2300/41; B60Q 2300/42; B60Q 2300/054; B60Q 1/10; B60Q 1/12; B60Q 1/14

See application file for complete search history.

(56) References Cited

U.S. PATENT DOCUMENTS

| | | | |
|---|---|---|---|
| 2017/0182930 A1* | 6/2017 | Sakamoto | ............ B62J 45/4151 |
| 2017/0198877 A1* | 7/2017 | Suwa | ........................ B62J 6/022 |
| 2017/0327030 A1* | 11/2017 | Kim | ........................ B60Q 1/115 |
| 2019/0126814 A1* | 5/2019 | Kay | ........................ F21S 41/265 |
| 2019/0366908 A1* | 12/2019 | Horn | ........................ B60Q 1/085 |

FOREIGN PATENT DOCUMENTS

| | | | |
|---|---|---|---|
| JP | 2017123348 A | 7/2017 | |
| JP | 2018020772 A | 2/2018 | |
| TW | M489809 U | 11/2014 | |
| WO | 2018168249 A1 | 9/2018 | |
| WO | 2019039051 A1 | 2/2019 | |

OTHER PUBLICATIONS

Masanori Motoki et al., "Study on the visibility of adaptive front lighting system (AFS) for motorcycles", JARI Research Journal, Mar. 2008, vol. 30, No. 3, pp. 131-134, ISSN 0387-3803.

\* cited by examiner

HEADLIGHT DEVICE AND LEANING VEHICLE INCLUDING HEADLIGHT DEVICE

CROSS-REFERENCE TO RELATED APPLICATIONS

This is a continuation application of Ser. No. 17/565,561 filed on Dec. 30, 2021, which is a continuation-in-part application of International Application PCT/JP2020/026028, filed on Jul. 2, 2020, which claims priority from International Application PCT/JP2019/026901, filed on Jul. 5, 2019. The contents of the applications are incorporated herein by reference.

TECHNICAL FIELD

The present teaching relates to a headlight device for use in a leaning vehicle, and specifically relates to a headlight device that changes an emission area without any operation made by a rider of the leaning vehicle.

BACKGROUND ART

A leaning vehicle such as a motorcycle is conventionally known. The leaning vehicle includes a vehicle body. The vehicle body leans to the left when the leaning vehicle turns to the left, and leans to the right when the leaning vehicle turns to the right.

Recently known is a headlight device for use in a leaning vehicle, the headlight device being configured to change its emission area without any operation made by a rider of the leaning vehicle. A headlight device of this type is disclosed in WO2018/168249.

CITATION LIST

Patent Literature

PTL 1: WO2018/168249

SUMMARY OF INVENTION

Technical Problem

It is desired that the headlight device shown in the Literature above offers an increase in convenience.

The present teaching aims to increase the convenience of a headlight device for use in a leaning vehicle, the headlight device being configured to change its emission area without any operation made by a rider of the leaning vehicle. The emission area is the three-dimensional space illuminated by the light beam formed by a light source in the headlight device.

Solution to the Problem

The inventors of the present application conducted a test run of the leaning vehicle that includes a headlight device that changes its emission area without any operation made by a rider of the leaning vehicle. Consequently, the inventors found out the followings.

The inventors of the present application conducted a test run of the leaning vehicle that includes a headlight device that emits light to form an emission area including at least one of a lower emission area; an upper central emission area disposed farther in the upward direction than the lower emission area; an upper left emission area disposed farther in the left direction than the upper central emission area; or an upper right emission area disposed farther in the right direction than the upper central emission area. Each of these emission areas is the space illuminated by the light beam formed by a light source in the headlight device. Thus, the lower emission area, the upper central emission area, the upper left emission area and the upper right emission area are respectively spaces illuminated by a lower light source, an upper central light source, an upper left light source and an upper right light source in the headlight device.

The foregoing headlight device changes its emission area while the leaning vehicle is turning. More specifically, when the leaning vehicle turns left, the headlight device forms the upper left emission area. But if an oncoming vehicle and/or a preceding vehicle is/are present in the upper left emission area, the headlight device does not form the upper left emission area. A case of the leaning vehicle turning right will not be described herein, because it is simply the left-right opposite to the case of the leaning vehicle turning left.

While the leaning vehicle is turning left, the upper left emission area is formed in a region that is covered by the view of a rider of the leaning vehicle during the turn of the leaning vehicle. Thus, if the upper left emission area is not formed because of the presence of an oncoming vehicle and/or a preceding vehicle in the upper left emission area while the leaning vehicle is turning left, the ease of viewing, which is a benefit of formation of the upper left emission area, cannot be obtained. The same applies to the left-right opposite side, i.e., to the case of the leaning vehicle turning right.

The inventors of the present application studied how dazzling the upper left emission area is to a rider of an oncoming vehicle or a preceding vehicle that is present in the upper left emission area while the leaning vehicle is turning left. It was consequently discovered that the rider of the oncoming vehicle or the preceding vehicle is not dazzled so much even though the upper left emission area is formed. The inventors conducted the same studies also for the case of the leaning vehicle turning right, and obtained the same discovery.

This knowledge was not obtained until the present inventors conducted the studies. The present teaching is accomplished based on such knowledge.

A headlight device according to an embodiment of the present teaching is used in a leaning vehicle including a vehicle body that leans in a left direction when turning in the left direction and leans in a right direction when turning in the right direction. The headlight device includes a headlight and a control device. The headlight is configured to emit light frontward of the leaning vehicle to form: a lower emission area; an upper central emission area disposed farther in an upward direction than the lower emission area; an upper left emission area disposed farther in the left direction than the upper central emission area; and an upper right emission area disposed farther in the right direction than the upper central emission area. The control device controls light emission from the headlight such that the light emission from the headlight changes without any operation made by a rider of the leaning vehicle.

In the headlight device according to the embodiment of the present teaching, the control device controls light emission from the headlight such that when neither an oncoming vehicle nor a preceding vehicle is present in the upper left emission area while the leaning vehicle is traveling straight, the upper left emission area is formed, and when the oncoming vehicle and/or the preceding vehicle is/are present in the upper left emission area while the leaning vehicle is traveling straight, the upper left emission area is reduced at least in its brightness as compared to when neither the oncoming vehicle nor the preceding vehicle is present in the upper left emission area while the leaning vehicle is traveling straight. The control device controls light emission from the headlight such that when neither the oncoming vehicle nor the preceding vehicle is present in the upper left emission area while the leaning vehicle is turning in the left direction, the upper left emission area is formed, and when the oncoming vehicle and/or the preceding vehicle is/are present in the upper left emission area while the leaning vehicle is turning in the left direction, the upper left emission area is maintained at least in its brightness as compared to when neither the oncoming vehicle nor the preceding vehicle is present in the upper left emission area while the leaning vehicle is turning in the left direction. The control device controls light emission from the headlight such that when neither the oncoming vehicle nor the preceding vehicle is present in the upper right emission area while the leaning vehicle is traveling straight, the upper right emission area is formed, and when the oncoming vehicle and/or the preceding vehicle is/are present in the upper right emission area while the leaning vehicle is traveling straight, the upper right emission area is reduced at least in its brightness as compared to when neither the oncoming vehicle nor the preceding vehicle is present in the upper right emission area while the leaning vehicle is traveling straight. The control device controls light emission from the headlight such that when neither the oncoming vehicle nor the preceding vehicle is present in the upper right emission area while the leaning vehicle is turning in the right direction, the upper right emission area is formed, and when the oncoming vehicle and/or the preceding vehicle is/are present in the upper right emission area while the leaning vehicle is turning in the right direction, the upper right emission area is maintained at least in its brightness as compared to when neither the oncoming vehicle nor the preceding vehicle is present in the upper right emission area while the leaning vehicle is turning in the right direction.

The foregoing headlight device can offer an increase in convenience, specifically as follows.

When the leaning vehicle is turning in the left direction, the foregoing headlight device forms the upper left emission area and maintains the brightness of the upper left emission area irrespective of whether or not the oncoming vehicle and/or the preceding vehicle is/are present. Here, the upper left emission area is formed in a region that is covered by the view of the rider of the leaning vehicle while the leaning vehicle is turning in the left direction. In other words, the direction in which the headlight illuminates is the same as the direction in which the rider of the leaning vehicle looks while the leaning vehicle is turning in the left direction. Accordingly, the foregoing headlight device can expand the field of view of the rider of the leaning vehicle while the leaning vehicle is turning in the left direction. A case of the leaning vehicle turning in the right direction will not be described herein, because it is simply the left-right opposite to the case of the leaning vehicle turning in the left direction.

In the headlight device according to the embodiment of the present teaching, an emission area is formed by, for example, a light source provided to the headlight emitting light frontward of the leaning vehicle. The light source is, for example, a light emitting diode, a semiconductor laser, an HID (High-Intensity Discharge) valve, a halogen bulb, an incandescent light bulb, or the like. The light source may directly emit light frontward of the leaning vehicle, or may emit light frontward of the leaning vehicle via a reflection member that reflects light.

In the headlight device according to the embodiment of the present teaching, the control device is an ECU (Electric Control Unit), for example. The ECU is implemented by, for example, a combination of an IC (Integrated Circuit), an electronic component, a circuit board, and the like. A control performed by the control device is implemented by, for example, a CPU (Central Processing Unit) reading out a program stored in a non-volatile memory and executing a predetermined process in accordance with the program.

In the present teaching, the oncoming vehicle is not particularly limited, and the only limitation thereon is that it is a vehicle traveling in a direction opposite to a direction in which a leaning vehicle including the headlight device according to the embodiment of the present teaching is traveling.

In the present teaching, the preceding vehicle is not particularly limited, and the only limitation thereon is that it is a vehicle traveling in the same direction as the direction in which a leaning vehicle including the headlight device according to the embodiment of the present teaching is traveling. The preceding vehicle may not always need to be traveling in the same driving lane as the driving lane where a leaning vehicle including the headlight device according to the embodiment of the present teaching is traveling.

In the headlight device according to the embodiment of the present teaching, the term "operation" in the wording "without any operation made by the rider of the leaning vehicle" does not include, for example, an operation that the rider of the leaning vehicle performs to select a control mode in which the emission area is changed in accordance with a traveling status of the vehicle.

In the headlight device according to the embodiment of the present teaching, an aspect in which the upper central emission area is formed farther in the upward direction than the lower emission area is not particularly limited, and the only limitation thereon is that the center of the upper central emission area is formed above the center of the lower emission area. The lower end of the upper central emission area may overlap the upper end of the lower emission area, may be above the upper end of the lower emission area, or may be below the upper end of the lower emission area. An aspect in which the lower end of the upper central emission area overlaps the upper end of the lower emission area encompasses an aspect in which at least a part of the lower end of the upper central emission area overlaps at least a part of the upper end of the lower emission area.

In the headlight device according to the embodiment of the present teaching, an aspect in which the upper left emission area is formed farther in the left direction than the upper central emission area is not particularly limited, and the only limitation thereon is that the center of the upper left emission area is formed to the left of the center of the upper central emission area. The right end of the upper left emission area may overlap the left end of the upper central emission area, may be to the left of the left end of the upper central emission area, or may be to the right of the left end of the upper central emission area. An aspect in which the right end of the upper left emission area overlaps the left end of the upper central emission area encompasses an aspect in which at least a part of the right end of the upper left emission area overlaps at least a part of the left end of the upper central emission area.

In the headlight device according to the embodiment of the present teaching, an aspect in which the upper right emission area is formed farther in the right direction than the upper central emission area is not particularly limited, and the only limitation thereon is that the center of the upper right emission area is formed to the right of the center of the upper central emission area. The left end of the upper right emission area may overlap the right end of the upper central emission area, may be to the right of the right end of the upper central emission area, or may be to the left of the right end of the upper central emission area. An aspect in which the left end of the upper right emission area overlaps the right end of the upper central emission area encompasses an aspect in which at least a part of the left end of the upper right emission area overlaps at least a part of the right end of the upper central emission area.

In the headlight device according to the embodiment of the present teaching, the wording "maintain the brightness of the emission area" means that the brightness of the emission area given by light emitted from the headlight is kept constant or substantially constant. A state where the light source is controlled so as to keep the brightness of the emission area constant, and as a result the brightness of the emission area appears to be kept constant to a rider is one example of the state where the brightness of the emission area given by light emitted from the headlight is kept constant. For instance, there can be a situation where a voltage applied to the light source is controlled so as to maintain the brightness of the emission area, but nevertheless the brightness of the emission area changes due to disturbance. This is one example of the state where the brightness of the emission area given by light emitted from the headlight is kept substantially constant. The disturbance is, for example, a voltage fluctuation occurring in a battery that is provided in the leaning vehicle and stores electric power to be supplied to the light source. An aspect in which the light source is controlled so as to keep the brightness of the emission area constant encompasses, for example, an aspect in which the light source comprises plural light sources for emitting light to form the emission area, and voltages applied to the plural light sources are adjusted relative to one another. The aspect in which the voltages applied to the plural light sources are adjusted relative to one another encompasses, for example, an aspect in which a voltage applied to one light source is set lower while a voltage applied to another light source is set higher. In short, in a case of forming the emission area by the plural light sources emitting light, it is acceptable to adjust voltages applied to the plural light sources relative to one another, as long as the brightness of the emission area appears to be kept constant to the rider. To obtain a state where the brightness of the emission area looks constant to the rider, it is just required that, for example, the brightness of a portion of the emission area that looks brightest to the rider appears to be kept constant to the rider. Accordingly, for example, even if the brightest-looking portion of the emission area is displaced as a result of adjusting the voltages applied to the plural light sources relative to one another, such a state is still included in the state where the brightness of the emission area is kept constant, as long as the brightness of the brightest-looking portion is kept constant. Even when a control for changing the brightness is performed to an extent that the brightness of the emission area is still kept constant to the rider, such a state is one example of the state where the brightness of the emission area given by light emitted from the headlight is kept substantially constant.

In the headlight device according to the embodiment of the present teaching, an aspect in which the emission area is reduced in its brightness encompasses an aspect in which the emission area is partially reduced in its brightness, for example.

In the headlight device according to the embodiment of the present teaching, the aspect in which the emission area is reduced in its brightness encompasses an aspect in which the emission area is removed. Thus, the aspect in which the emission area is reduced in its brightness encompasses not only an aspect in which the light source for emitting light to form the emission area is turned on in a dimmed state but also an aspect in which the light source for emitting light to form the emission area is turned off.

In the headlight device according to the embodiment of the present teaching, the control device may control light emission from the headlight such that while the leaning vehicle is turning in the left direction, at least one of the lower emission area, the upper central emission area, or the upper right emission area is reduced in its brightness. The control device may control light emission from the headlight such that while the leaning vehicle is turning in the right direction, at least one of the lower emission area, the upper central emission area, or the upper left emission area is reduced in its brightness.

In the headlight device according to the embodiment of the present teaching, the lower emission area may include a lower central emission area formed farther in a downward direction than the upper central emission area, a lower left emission area formed farther in the downward direction than the upper left emission area and farther in the left direction than the lower central emission area, and a lower right emission area formed farther in the downward direction than the upper right emission area and farther in the right direction than the lower central emission area.

In the headlight device according to the embodiment of the present teaching, the lower left emission area, the lower right emission area, the upper left emission area, and the upper right emission area may each include plural sub-emission areas that are arranged in an up-down direction of the vehicle body. The control device may control light emission from the headlight such that the lower central emission area is formed while the upper central emission area is not formed. In this case, a left low-beam emission area, which is located below a horizontal reference line and closest to the horizontal reference line, may be formed in accordance with a lean angle of the vehicle body, the left low-beam emission area being formed out of the plural sub-emission areas included in the lower left emission area and the plural sub-emission areas included in the upper left emission area. A right low-beam emission area, which is located below the horizontal reference line and closest to the horizontal reference line, may be formed in accordance with a lean angle of the vehicle body, the right low-beam emission area being formed out of the plural sub-emission areas included in the lower right emission area and the plural sub-emission areas included in the upper right emission area. The horizontal reference line is a straight line formed by extending a boundary line in each the left direction and the right direction of the leaning vehicle, the boundary line being a line that defines the upper end of the lower central emission area and extends in a left-right direction of the leaning vehicle when the vehicle body is upright.

In the headlight device according to the embodiment of the present teaching, the wording "the left low-beam emission area being located below a horizontal reference line and closest to the horizontal reference line" refers to a sub-emission area whose center is closest to the horizontal reference line among the plural sub-emission areas that are formed farther in the left direction than the lower central emission area and have their centers located below the horizontal reference line, for example. If a sub-emission area is formed as the left low-beam emission area but its center is then displaced as a result of a change in the lean angle of the vehicle body so that its center overlaps the horizontal reference line or comes above the horizontal reference line, the sub-emission area is no longer formed as the left low-beam emission area.

In the headlight device according to the embodiment of the present teaching, the wording "the right low-beam emission area being located below the horizontal reference line and closest to the horizontal reference line" refers to a sub-emission area whose center is closest to the horizontal reference line among the plural sub-emission areas that are formed farther in the right direction than the lower central emission area and have their centers located below the horizontal reference line, for example. If a sub-emission area is formed as the right low-beam emission area but its center is then displaced as a result of a change in the lean angle of the vehicle body so that its center overlaps the horizontal reference line or comes above the horizontal reference line, the sub-emission area is no longer formed as the right low-beam emission area.

The headlight device according to the embodiment of the present teaching may further include a detection device. The detection device detects an oncoming vehicle and/or a preceding vehicle. The detection device may be configured to detect light emitted from the oncoming vehicle and/or the preceding vehicle.

In the headlight device according to the embodiment of the present teaching, the headlight may include: at least one light source that emits light frontward the leaning vehicle; and a housing that accommodates the at least one light source. The housing accommodates the detection device. The housing may include a housing body and an outer lens. The outer lens is attached to the housing body, and is disposed more frontward than the at least one light source. When viewed in the rear direction of the leaning vehicle, the outer lens has a circular shape, for example. The housing may accommodate the control device.

A leaning vehicle according to an embodiment of the present teaching includes: a vehicle body that leans in a left direction when turning in the left direction and leans in a right direction when turning in the right direction; and the headlight device according to the above-described embodiment of the present teaching.

These and other objects, features, aspects and advantages of the present teaching will become apparent from the following detailed description, which, taken in conjunction with the accompanying drawings, discloses some embodiments of the present teaching. As used herein, the term "and/or" includes any and all combinations of one or more of the associated listed items. As used herein, the terms "including", "comprising", or "having", and variations thereof specify the presence of stated features, steps, operations, elements, components, and/or equivalents thereof, and can include one or more of steps, operations, elements, components, and/or their groups. Unless otherwise defined, all terms (including technical and scientific terms) used herein have the same meaning as commonly understood by one of ordinary skill in the art to which the present teaching belongs. It will be further understood that terms, such as those defined in commonly used dictionaries, should be interpreted as having a meaning that is consistent with their meaning in the context of the present disclosure and relevant art and should not be interpreted in an idealized or overly formal sense unless expressly so defined herein. It will be understood that the description of the present teaching discloses a number of techniques and steps. Each of these has individual benefit and each can also be used in conjunction with one or more, or in some cases all, of the other disclosed techniques. Accordingly, for the sake of clarity, this description will refrain from repeating every possible combination of the individual steps in an unnecessary fashion. Nevertheless, Description and Claims should be read with the understanding that such combinations are entirely within the scope of the present teaching and the claims. In the description given below, for the purposes of explanation, numerous specific details are set forth in order to provide a thorough understanding of the present teaching. It will be apparent, however, that those skilled in the art may practice the present teaching without these specific details. The present disclosure is to be considered as an exemplification of the present teaching, and is not intended to limit the present teaching to the specific embodiments illustrated by drawings or descriptions below.

Advantageous Effects of Invention

According to the present teaching, the convenience of a headlight device for use in a leaning vehicle can be increased, the headlight device being configured to change its emission area without any operation made by a rider of the leaning vehicle.

DESCRIPTION OF EMBODIMENTS

In the following, details of a leaning vehicle according to an embodiment of the present teaching will be described with reference to the drawings. The embodiment described below is just an example. The present teaching should not be limited in any way by the embodiment described below.

Figure 1:
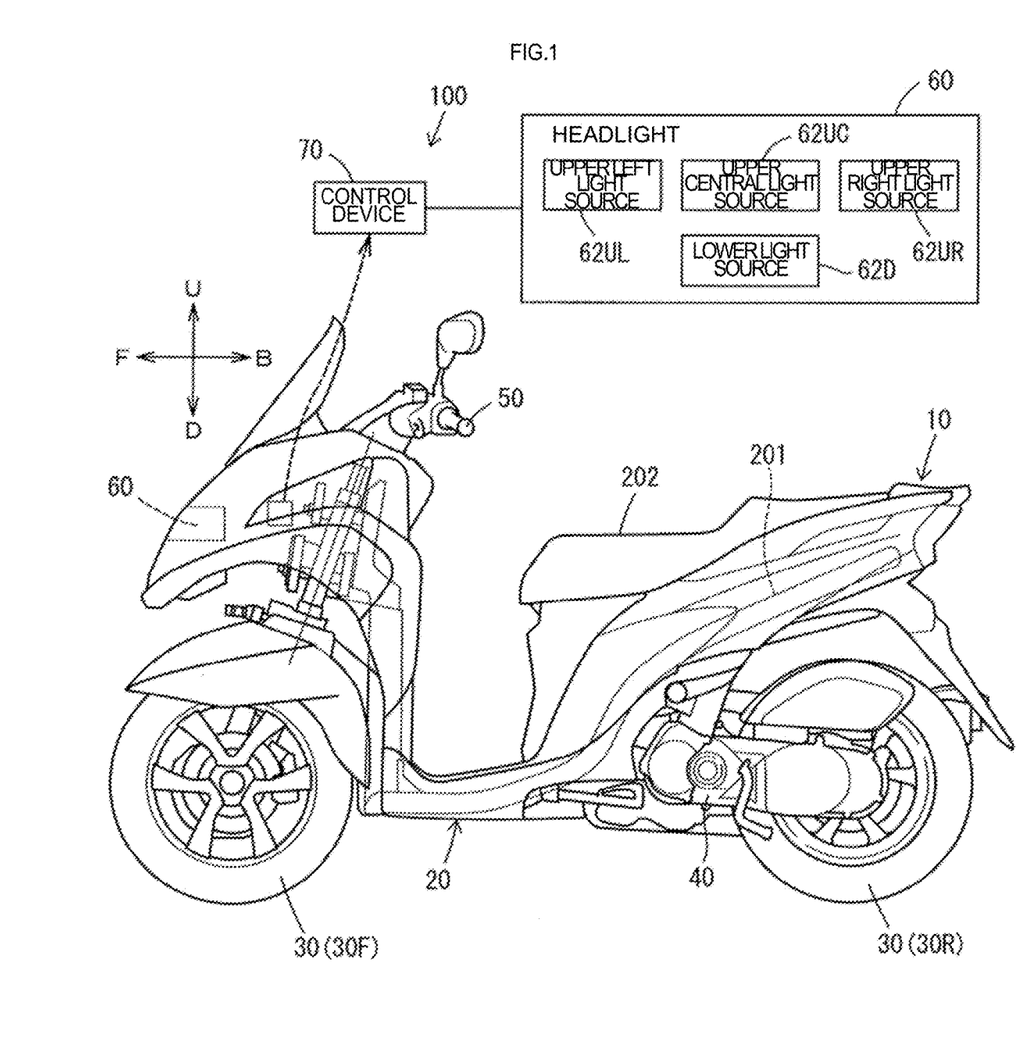
FIG. 1 is a diagram containing a left side view of a leaning vehicle according to an embodiment of the present teaching, and a block diagram showing a schematic configuration of a headlight device included in the leaning vehicle.

Referring to FIG. 1, a leaning vehicle 10 according to the embodiment of the present teaching will be described. A diagram in FIG. 1 contains a left side view of the leaning vehicle 10 and a block diagram of a headlight device 100 included in the leaning vehicle 10.

Referring to FIG. 1, the leaning vehicle 10 includes a vehicle body 20, plural wheels 30, a power unit 40, and a handlebar 50. These will be described below.

The vehicle body 20 leans in a left direction L when the leaning vehicle 10 turns in the left direction L, and leans in a right direction R when the leaning vehicle 10 turns in the right direction R. The vehicle body 20 includes a vehicle body frame 201 and a seat 202. The vehicle body frame 201 supports the power unit 40. The power unit 40 includes, for example, an engine as a drive source, a transmission, and the like. On the seat 202, a rider of the leaning vehicle 10 sits.

The vehicle body 20 supports the plural wheels 30. The plural wheels 30 lean in the left direction L together with the vehicle body 20 when the leaning vehicle 10 turns in the left direction L, and lean in the right direction R together with the vehicle body 20 when the leaning vehicle 10 turns in the right direction R. The plural wheels 30 include a front wheel 30F and a rear wheel 30R, the front wheel 30F being steered by the rider operating the handlebar 50, the rear wheel 30R being rotated by receiving power of the power unit 40.

The leaning vehicle 10 further includes the headlight device 100. The headlight device 100 includes a headlight 60 and a control device 70.

The headlight 60 emits light frontward of the leaning vehicle 10. The headlight 60 includes plural light sources 62. Each of the plural light sources 62 emits light frontward of the leaning vehicle 10. The headlight 60 is supported by the vehicle body 20.

The plural light sources 62 include at least one lower light source 62D, at least one upper central light source 62UC, at least one upper left light source 62UL, and at least one upper right light source 62UR. In FIG. 1, for reasons of expediency, one lower light source 62D, one upper central light source 62UC, one upper left light source 62UL, and one upper right light source UR are shown.

The lower light source 62D emits light such that a lower emission area is formed. The upper central light source 62UC emits light such that an upper central emission area is formed farther in the upward direction than the lower emission area. The upper left light source 62UL emits light such that an upper left emission area is formed farther in the left direction than the upper central emission area. The upper right light source 62UR emits light such that an upper right emission area is formed farther in the right direction than the upper central emission area.

The emission areas are formed by the headlight 60 emitting light frontward of the leaning vehicle 10. The emission areas can be checked by placing a screen in front of the leaning vehicle 10 and causing the headlight 60 to emit light toward the screen.

The control device 70 controls light emission from the headlight 60, by turning on the headlight 60 in such a manner that at least one of the plural light sources 62 is turned off or dimmed in accordance with a traveling status of the leaning vehicle 10 and without any operation made by the rider of the leaning vehicle 10. Thus, the control device 70 controls light emission from the headlight 60 such that an emission area of the headlight 60 changes in accordance with the traveling status of the leaning vehicle 10. In other words, the control device 70 controls light emission from the headlight 60 such that the light emission from the headlight 60 changes in accordance with the traveling status of the leaning vehicle 10. Here, the traveling status of the leaning vehicle 10 encompasses leaning of the vehicle body 20 and the presence of an oncoming vehicle and/or a preceding vehicle, for example. The leaning of the vehicle body 20 is determined based on a signal from a lean angle detection device configured to detect a lean angle of the vehicle body 20, for example. The presence of an oncoming vehicle and/or a preceding vehicle is determined based on a signal from a vehicle detection device configured to detect an oncoming vehicle and/or a preceding vehicle, for example.

The control device 70 controls light emission from the headlight 60 such that when neither an oncoming vehicle nor a preceding vehicle is present in the upper left emission area while the leaning vehicle 10 is traveling straight, the upper left emission area is formed, and when an oncoming vehicle and/or a preceding vehicle is/are present in the upper left emission area while the leaning vehicle 10 is traveling straight, the upper left emission area is reduced at least in its brightness as compared to when neither an oncoming vehicle nor a preceding vehicle is present in the upper left emission area while the leaning vehicle 10 is traveling straight. The control device 70 controls light emission from the headlight 60 such that when neither an oncoming vehicle nor a preceding vehicle is present in the upper left emission area while the leaning vehicle 10 is turning in the left direction L, the upper left emission area is formed, and when an oncoming vehicle and/or a preceding vehicle is/are present in the upper left emission area while the leaning vehicle 10 is turning in the left direction L, the upper left emission area is maintained at least in its brightness as compared to when neither an oncoming vehicle nor a preceding vehicle is present in the upper left emission area while the leaning vehicle 10 is turning in the left direction L. Here, it may be possible that when an oncoming vehicle and/or a preceding vehicle is/are present in the upper left emission area while the leaning vehicle 10 is turning in the left direction L, the control device 70 maintains the brightness of the upper left emission area and reduces the brightness of at least one of the upper central emission area, the upper right emission area, or the lower emission area as compared to when neither an oncoming vehicle nor a preceding vehicle is present in the upper left emission area while the leaning vehicle 10 is turning in the left direction L, or the control device 70 maintains the brightness of the upper left emission area, the brightness of the upper central emission area, the brightness of the upper right emission area, and the brightness of the lower emission area as compared to when neither an oncoming vehicle nor a preceding vehicle is present in the upper left emission area while the leaning vehicle 10 is turning in the left direction L.

The control device 70 controls light emission from the headlight 60 such that when neither an oncoming vehicle nor a preceding vehicle is present in the upper right emission area while the leaning vehicle 10 is traveling straight, the upper right emission area is formed, and when an oncoming vehicle and/or a preceding vehicle is/are present in the upper right emission area while the leaning vehicle 10 is traveling straight, the upper right emission area is reduced at least in its brightness as compared to when neither an oncoming vehicle nor a preceding vehicle is present in the upper right emission area while the leaning vehicle 10 is traveling straight. The control device 70 controls light emission from the headlight 60 such that when neither an oncoming vehicle nor a preceding vehicle is present in the upper right emission area while the leaning vehicle 10 is turning in the right direction R, the upper right emission area is formed, and when an oncoming vehicle and/or a preceding vehicle is/are present in the upper right emission area while the leaning vehicle 10 is turning in the right direction R, the upper right emission area is maintained at least in its brightness as compared to when neither an oncoming vehicle nor a preceding vehicle is present in the upper right emission area while the leaning vehicle 10 is turning in the right direction R. Here, it may be possible that when an oncoming vehicle and/or a preceding vehicle is/are present in the upper right emission area while the leaning vehicle 10 is turning in the right direction R, the control device 70 maintains the brightness of the upper right emission area and reduces the brightness of at least one of the upper central emission area, the upper left emission area, or the lower emission area as compared to when neither an oncoming vehicle nor a preceding vehicle is present in the upper right emission area while the leaning vehicle 10 is turning in the right direction R, or the control device 70 maintains the brightness of the upper left emission area, the brightness of the upper central emission area, the brightness of the upper right emission area, and the brightness of the lower emission area as compared to when neither an oncoming vehicle nor a preceding vehicle is present in the upper right emission area while the leaning vehicle 10 is turning in the right direction R.

Figure 2:
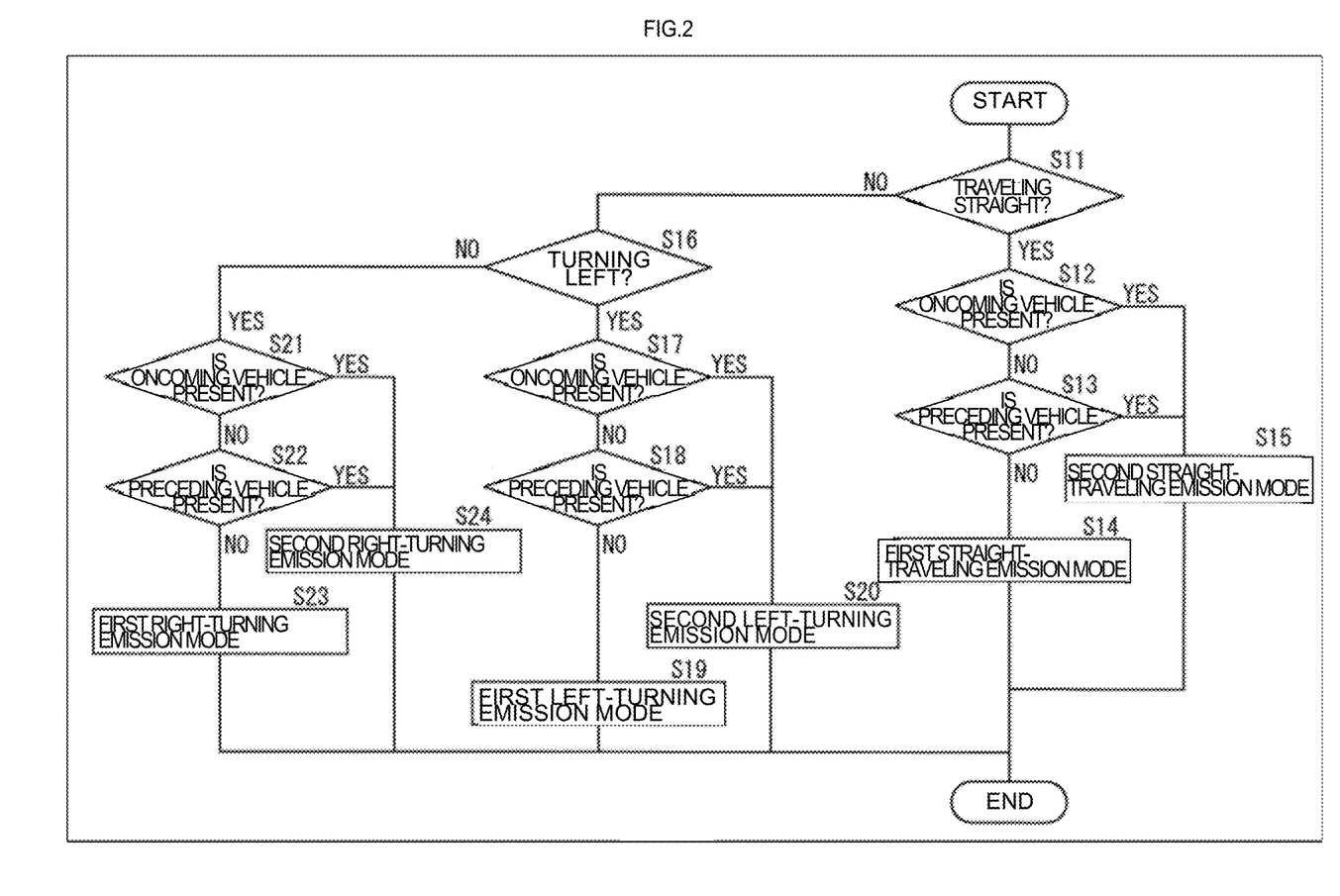
FIG. 2 is a flowchart showing an emission mode switching control, which is performed by a control device.

An emission mode switching control, which is performed by the control device 70, will be described with reference to FIG. 2. FIG. 2 is a flowchart showing the emission mode switching control performed by the control device 70.

First, in step S11, the control device 70 determines whether or not the leaning vehicle 10 is traveling straight. If the leaning vehicle 10 is traveling straight (step S11: YES), the control device 70 determines whether or not an oncoming vehicle is present (step S12). If no oncoming vehicle is present (step S12: NO), the control device 70 determines whether or not a preceding vehicle is present (step S13).

If no preceding vehicle is present (step S13: NO), the control device 70 controls light emission from the headlight 60 so as to have emission in a first straight-traveling emission mode (step S14). In the first straight-traveling emission mode, for example, the lower light source 62D, the upper central light source 62UC, the upper left light source 62UL, and the upper right light source 62UR are turned on. Then, the control device 70 terminates the emission mode switching control.

If an oncoming vehicle is present (step S12: YES), the control device 70 controls light emission from the headlight 60 so as to have emission in a second straight-traveling emission mode (step S15). In the second straight-traveling emission mode, for example, the lower light source 62D is turned on. Then, the control device 70 terminates the emission mode switching control.

If a preceding vehicle is present (step S13: YES), the control device 70 executes the processing of step S15 and subsequent steps.

If the leaning vehicle 10 is not traveling straight (step S11: NO), the control device 70 determines whether or not the leaning vehicle 10 is turning in the left direction L (step S16). If the leaning vehicle 10 is turning in the left direction L (step S16: YES), the control device 70 determines whether or not an oncoming vehicle is present in the upper left emission area (step S17). If no oncoming vehicle is present (step S17: NO), the control device 70 determines whether or not a preceding vehicle is present in the upper left emission area (step S18).

If no preceding vehicle is present in the upper left emission area (step S18: NO), the control device 70 controls light emission from the headlight 60 so as to have emission in a first left-turning emission mode (step S19). In the first left-turning emission mode, for example, the lower light source 62D, the upper central light source 62UC, and the upper left light source 62UL are turned on. Then, the control device 70 terminates the emission mode switching control.

If an oncoming vehicle is present in the upper left emission area (step S17: YES), the control device 70 controls light emission from the headlight 60 so as to have emission in a second left-turning emission mode (step S20). In the second left-turning emission mode, for example, the lower light source 62D and the upper left light source 62UL are turned on. Then, the control device 70 terminates the emission mode switching control.

If a preceding vehicle is present in the upper left emission area (step S18: YES), the control device 70 executes the processing of step S20 and subsequent steps.

If the leaning vehicle 10 is turning in the right direction R (step S16: NO), the control device 70 determines whether or not an oncoming vehicle is present in the upper right emission area (step S21). If no oncoming vehicle is present in the upper right emission area (step S21: NO), the control device 70 determines whether or not a preceding vehicle is present in the upper right emission area (step S22).

If no preceding vehicle is present in the upper right emission area (step S22: NO), the control device 70 controls light emission from the headlight 60 so as to have emission in a first right-turning emission mode (step S23). In the first right-turning emission mode, for example, the lower light source 62D, the upper central light source 62UC, and the upper right light source 62UR are turned on. Then, the control device 70 terminates the emission mode switching control.

If an oncoming vehicle is present in the upper right emission area (step S21: YES), the control device 70 controls light emission from the headlight 60 so as to have emission in a second right-turning emission mode (step S24). In the second right-turning emission mode, for example, the lower light source 62D and the upper right light source 62UR are turned on. Then, the control device 70 terminates the emission mode switching control.

If a preceding vehicle is present in the upper right emission area (step S22: YES), the control device 70 executes the processing of step S24 and subsequent steps.

The headlight device 100 included in the leaning vehicle 10 can offer an increase in convenience, specifically as follows.

When the leaning vehicle 10 is turning in the left direction L, the headlight device 100 forms the upper left emission area and maintains the brightness of the upper left emission area irrespective of whether or not an oncoming vehicle and/or a preceding vehicle is/are present in the upper left emission area. Here, the upper left emission area is formed in a region that is covered by the view of the rider of the leaning vehicle 10 while the leaning vehicle 10 is turning in the left direction L. In other words, the direction in which the headlight 60 illuminates is the same as the direction in which the rider of the leaning vehicle 10 looks while the leaning vehicle 10 is turning in the left direction L. Accordingly, the headlight device 100 can expand the field of view of the rider of the leaning vehicle 10 while the leaning vehicle 10 is turning in the left direction L. A case of the leaning vehicle 10 turning in the right direction R will not be described herein, because it is simply the left-right opposite to the case of the leaning vehicle 10 turning in the left direction L.

(Variation of Headlight Device)

Figure 3:
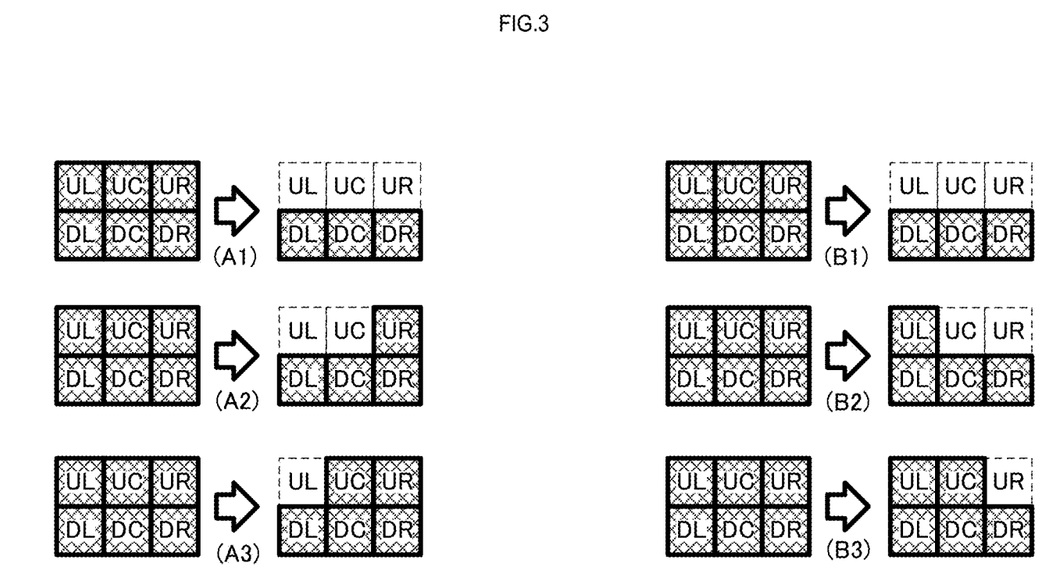
FIG. 3 is a diagram for illustrating how an emission area changes in response to emergence of an oncoming vehicle and/or a preceding vehicle while the leaning vehicle is traveling straight.
Figure 4A:
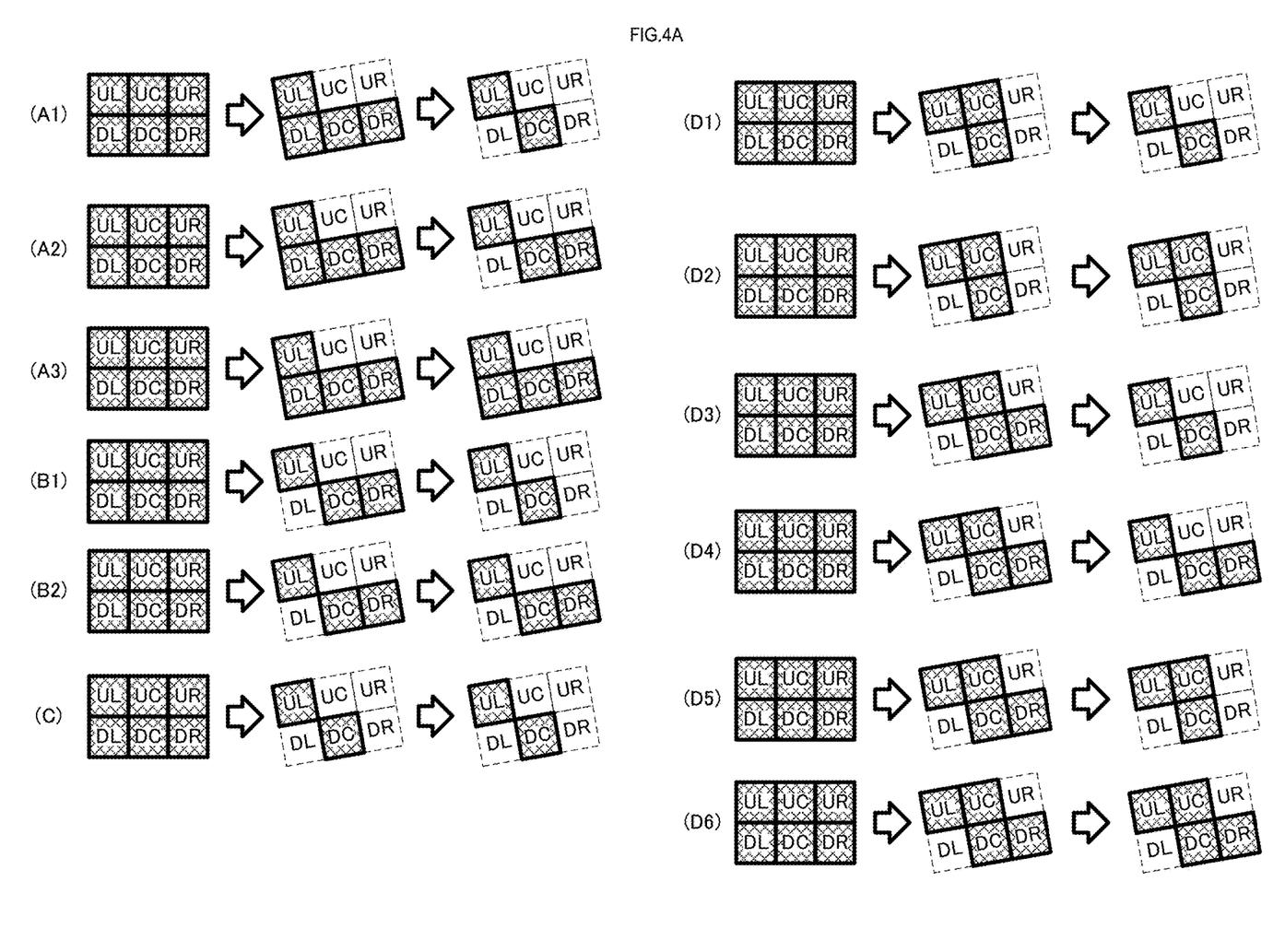
FIG. 4A is a diagram for illustrating how the emission area changes in response to a situation where the leaning vehicle traveling straight with no presence of either an oncoming vehicle or a preceding vehicle turns left, and then an oncoming vehicle and/or a preceding vehicle emerges while the leaning vehicle is turning left.
Figure 4B:
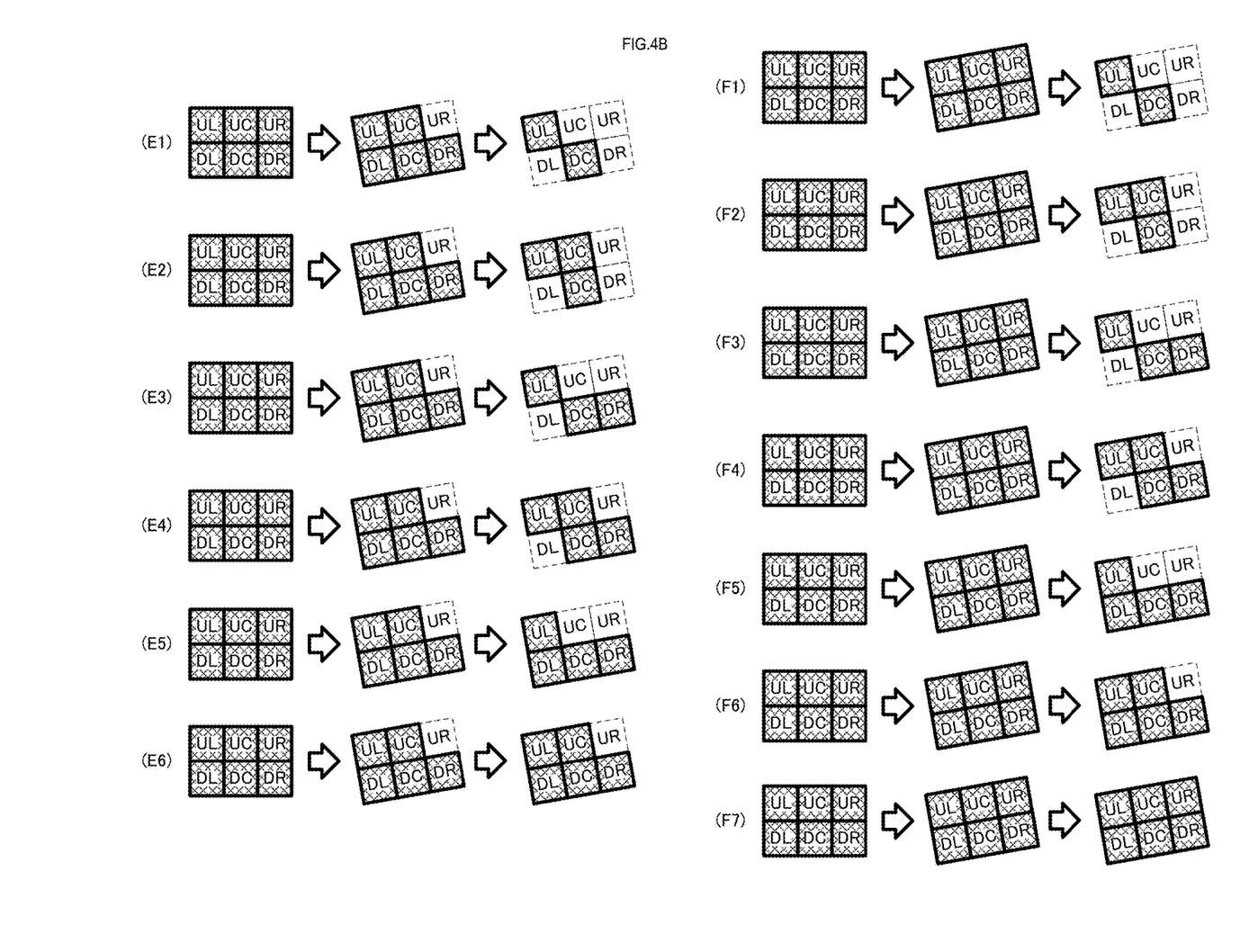
FIG. 4B is a diagram for illustrating how the emission area changes in response to the situation where the leaning vehicle traveling straight with no presence of either an oncoming vehicle or a preceding vehicle turns left, and then an oncoming vehicle and/or a preceding vehicle emerges while the leaning vehicle is turning left.
Figure 5A:
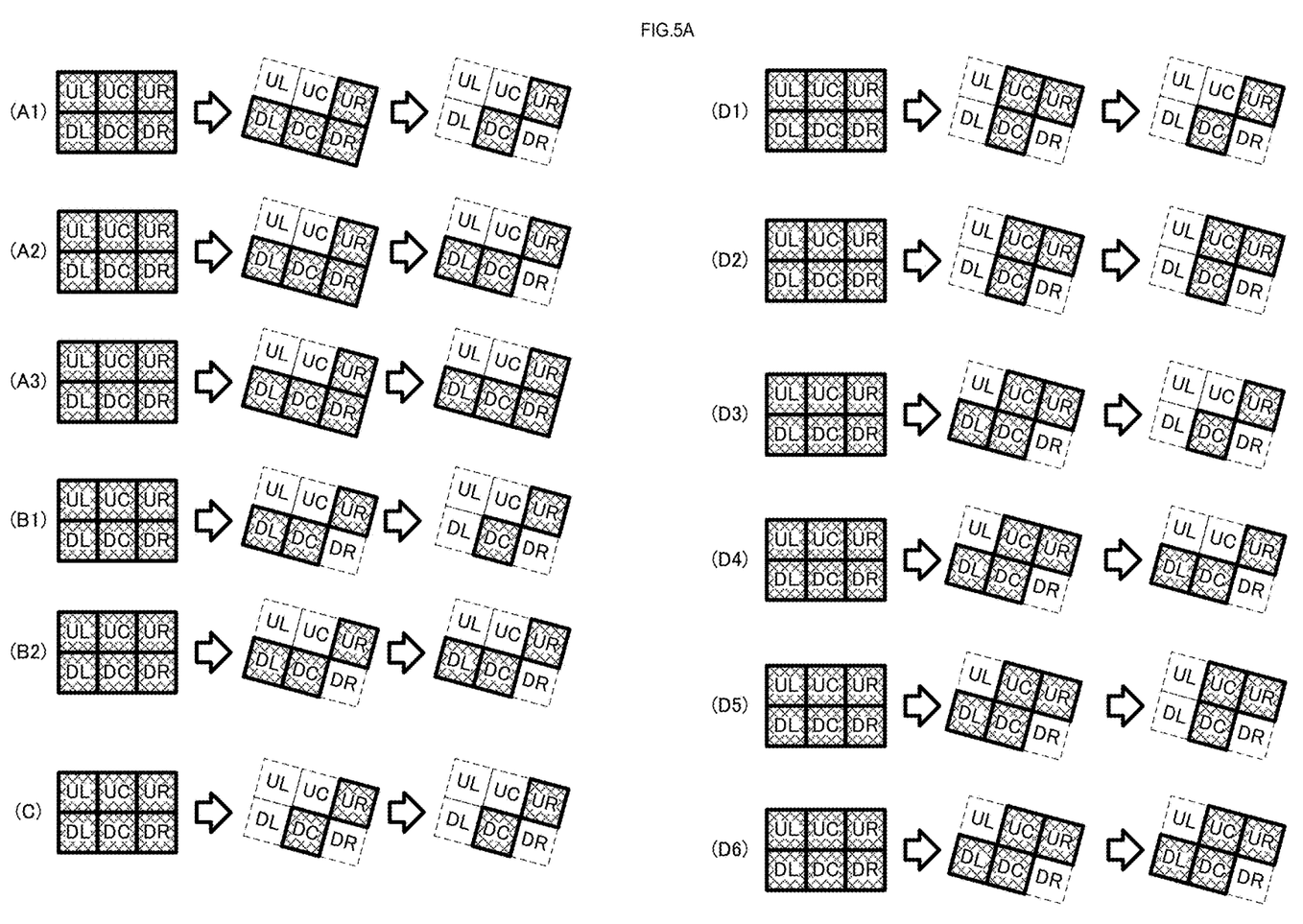
FIG. 5A is a diagram for illustrating how the emission area changes in response to a situation where the leaning vehicle traveling straight with no presence of either an oncoming vehicle or a preceding vehicle turns right, and then an oncoming vehicle and/or a preceding vehicle emerges while the leaning vehicle is turning right.
Figure 5B:
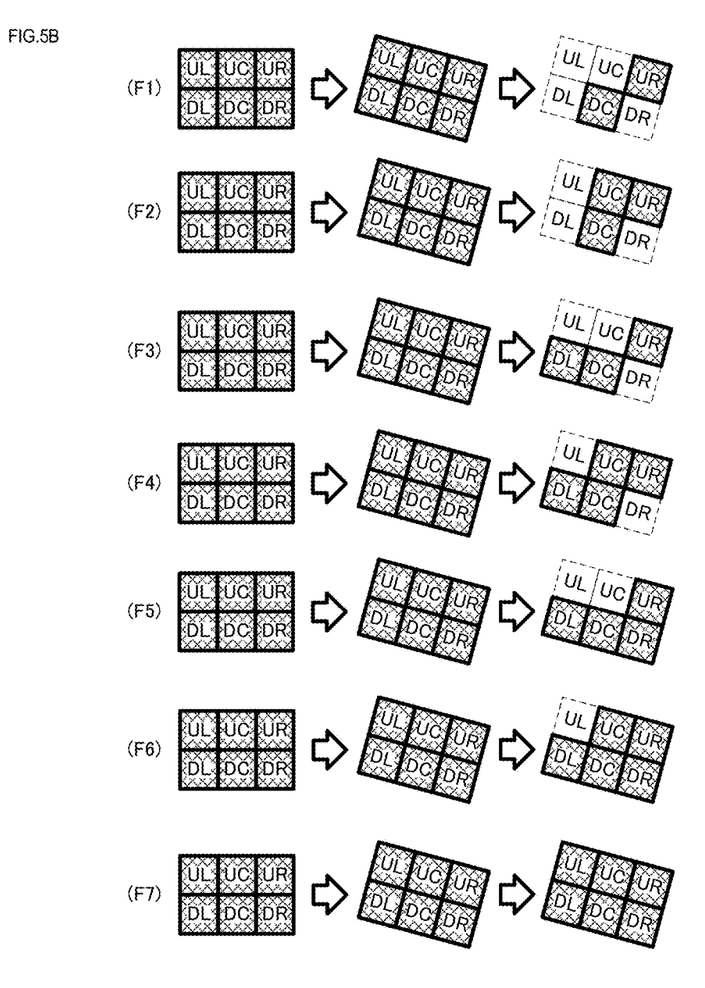
FIG. 5B is a diagram for illustrating how the emission area changes in response to the situation where the leaning vehicle traveling straight with no presence of either an oncoming vehicle or a preceding vehicle turns right, and then an oncoming vehicle and/or a preceding vehicle emerges while the leaning vehicle is turning right.

Variations of the headlight device will be described with reference to FIG. 3 through FIG. 5B, wherein each of the emission areas is shown in a two-dimensional conceptual figure, for illustration of the relative positions of the various emission areas. FIG. 3 shows some variations (A1)-(B3) of how the emission area changes while the leaning vehicle is traveling straight. In the variations (A1)-(A3), the emission areas shown left are emission areas obtained when neither an oncoming vehicle nor a preceding vehicle is present while the leaning vehicle is traveling straight, and the emission areas shown right are emission areas obtained when an oncoming vehicle and/or a preceding vehicle is/are present in the upper left emission area while the leaning vehicle is traveling straight. In the variations (B1)-(B3), the emission areas shown left are emission areas obtained when neither an oncoming vehicle nor a preceding vehicle is present while the leaning vehicle is traveling straight, and the emission areas shown right are emission areas obtained when an oncoming vehicle and/or a preceding vehicle is/are present in the upper right emission area while the leaning vehicle is traveling straight. FIG. 4A to FIG. 5B show some variations (A1)-(F6) of how the emission area changes while the leaning vehicle is turning. In each of the variations, the leftmost emission areas are emission areas obtained when neither an oncoming vehicle nor a preceding vehicle is present while the leaning vehicle is traveling straight, the middle emission areas are emission areas obtained when neither an oncoming vehicle nor a preceding vehicle is present in the upper left emission area (or in the upper right emission area in the cases of FIG. 5A and FIG. 5B) while the leaning vehicle is turning in the left direction L (or in the right direction R in the cases of FIG. 5A and FIG. 5B), and the rightmost emission areas are emission areas obtained when an oncoming vehicle and/or a preceding vehicle is/are present in the upper left emission area (or in the upper right emission area in the cases of FIG. 5A and FIG. 5B) while the leaning vehicle is turning in the left direction L (or in the right direction R in the cases of FIG. 5A and FIG. 5B). In FIG. 3 through FIG. 5B, an emission area corresponding to a light source being turned on is outlined with a solid line and rendered hatching. An emission area corresponding to a light source being turned off or being turned on in a dimmed manner is outlined with a broken line and not rendered hatching.

In FIG. 3 through FIG. 5B, the emission area formed by light emission from the headlight includes an upper left emission area UL, an upper central emission area UC, an upper right emission area UR, a lower left emission area DL, a lower central emission area DC, and a lower right emission area DR. Thus, the at least one lower light source includes at least one lower left light source that emits light so as to form the lower left emission area DL, at least one lower central light source that emits light so as to form the lower central emission area DC, and at least one lower right light source that emits light so as to form the lower right emission area DR. The headlight capable of forming the above-described emission areas is disclosed in WO2018/168249 for example, and therefore a detailed description thereof is omitted herein.

Variations of how the emission area changes are not limited to the ones illustrated in FIG. 3 through FIG. 5B. For example, in FIG. 4A and FIG. 4B, it may be possible that only either the lower central light source or the lower right light source is turned off or dimmed, if an oncoming vehicle and/or a preceding vehicle emerge(s) in the upper left emission area while the leaning vehicle is turning in the left direction L with the lower left light source, the lower central light source, and the lower right light source being turned on. For example, in FIG. 5A and FIG. 5B, it may be possible that only either the lower central light source or the lower left light source is turned off or dimmed, if an oncoming vehicle and/or a preceding vehicle emerge(s) in the upper right emission area while the leaning vehicle is turning in the right direction R with the lower left light source, the lower central light source, and the lower right light source being turned on.

(Other Variations of Headlight Device)

Figure 6:
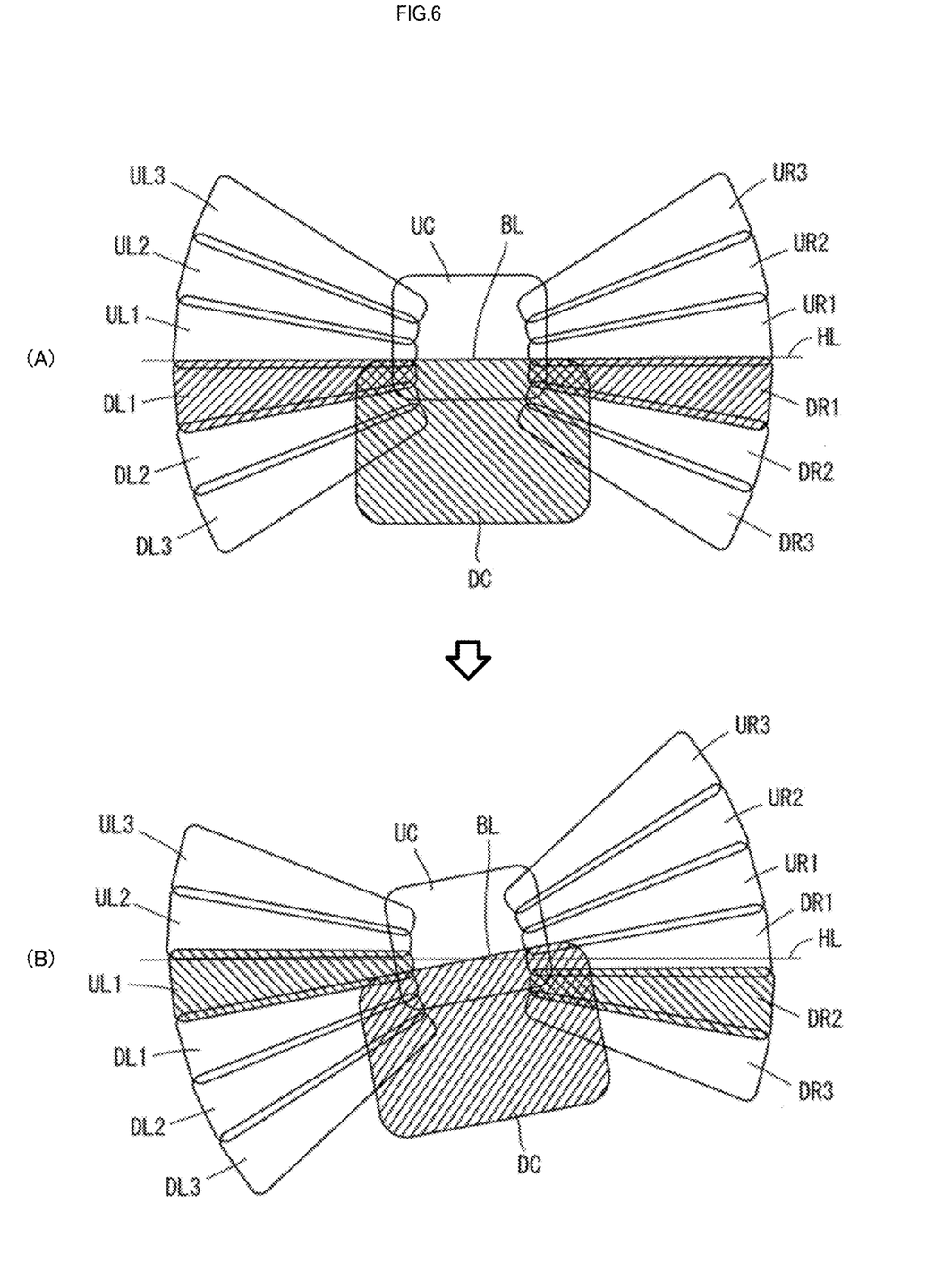
FIG. 6 is a diagram for illustrating another example of an emission area that is formed by light emitted from a headlight, and for illustrating how the emission area changes in response to a shift from a state where a vehicle body is upright to a state where the vehicle body is leaning left.

The headlight may include plural lower left light sources, a lower central light source, plural lower right light sources, plural upper left light sources, an upper central light source, and plural upper right light sources. The headlight having such a configuration emits light to form an emission area, an example of which is shown in FIG. 6. In FIG. 6, each of the emission areas and sub-emission areas are shown in a two-dimensional conceptual figure, for illustration of the relative positions of the various emission areas and sub-emission areas. Each of the sub-emission areas is the space illuminated by a sub-light beam formed by a light source in the headlight device.

Referring to FIG. 6, the plural lower left light sources form plural lower left sub-emission areas DL1, DL2, DL3 included in the lower left emission area. The lower central light source forms a lower central emission area DC. The plural lower right light sources form plural lower right sub-emission areas DR1, DR2, DR3 included in the lower right emission area. The plural upper left light sources form plural upper left sub-emission areas UL1, UL2, UL3 included in the upper left emission area. The upper central light source forms an upper central emission area UC. The plural upper right light sources form plural upper right sub-emission areas UR1, UR2, UR3 included in the upper right emission area. The headlight capable of forming the above-described emission areas is disclosed in WO2018/168249 for example, and therefore a detailed description thereof is omitted herein.

The control device may control light emission from the headlight such that the lower central emission area DC is formed while the upper central emission area UC is not formed. In this case, a left light source selected from the plural left light sources composed of the plural upper left light sources and the plural lower left light sources is turned on such that a left low-beam emission area, which is located below a horizontal reference plane (shown in FIG. 6 as a horizontal reference line HL) and closest to the horizontal reference plane (horizontal reference line HL in FIG. 6), is formed in accordance with the lean angle of the vehicle body. In other words, the left low-beam emission area is formed out of the plural lower left sub-emission areas DL1, DL2, DL3 and the plural upper left sub-emission areas UL1, UL2, UL3 in accordance with the lean angle of the vehicle body. A right light source selected from the plural right light sources composed of the plural upper right light sources and the plural lower right light sources is turned on such that a right low-beam emission area, which is located below the horizontal reference line HL and closest to the horizontal reference line HL, is formed in accordance with the lean angle of the vehicle body. In other words, the right low-beam emission area is formed out of the plural lower right sub-emission areas DR1, DR2, DR3 and the plural upper right sub-emission areas UR1, UR2, UR3 in accordance with the lean angle of the vehicle body. In FIG. 6, each of the left low-beam emission area, the lower central emission area DC, and the right low-beam emission area is rendered hatching. The left low-beam emission area and the right low-beam emission area in the pattern (B), which is adopted when the vehicle body leans in the left direction L, are different from those in the pattern (A), which is adopted when the vehicle body is upright. It should be noted that the horizontal reference line HL refers to a straight line formed by extending a boundary line BL in each the left direction L and the right direction R of the leaning vehicle, the boundary line BL being a line that defines the upper end of the lower central emission area DC and extends in the left-right direction of the leaning vehicle when the vehicle body is upright.

The above-described headlight device can emit a low beam in an expanded range.

Other Embodiments

The embodiment and variations, of which at least either one of description or illustration is given herein, are for ease of understanding the present disclosure, and not for limiting the concept of the present disclosure. The foregoing embodiment and variations may be altered and/or adapted without departing from the spirit of the present disclosure.

The spirit encompasses equivalent elements, modifications, omissions, combinations (for example, a combination of a feature of the embodiment and a feature of any variation), adaptations and/or alterations as would be appreciated by those skilled in the art based on the embodiment disclosed herein. The limitations in Claims are to be interpreted broadly based on the language employed in Claims and not limited to embodiments and variations described herein or during the prosecution of the present application. The embodiments and variations are to be construed as non-exclusive. For example, in this Description, the terms "preferably", "may", and "possible" are non-exclusive and mean "preferably, but not limited to", "may, but not limited to", and "possibly, but not limited to", respectively.

REFERENCE SIGNS LIST

10 leaning vehicle
20 vehicle body
60 headlight
62 light source
62D lower light source
62UC upper central light source
62UL upper left light source
62UR upper right light source
70 control device
100 headlight device

What is claimed is:

1. A headlight device for use in a leaning vehicle including a vehicle body that leans in a left direction when turning in the left direction and leans in a right direction when turning in the right direction, the headlight device comprising:

a headlight configured to emit light frontward of the leaning vehicle to form:
a lower light beam,
an upper central light beam above the lower light beam in an upward-downward direction,
an upper left light beam farther in the left direction than the upper central light beam, and
an upper right light beam farther in the right direction than the upper central light beam; and
a control device that controls light emission from the headlight such that the light emission from the headlight changes without any operation made by a rider of the leaning vehicle, by
forming both the upper left light beam and the upper right light beam while the leaning vehicle is traveling straight, and reducing a brightness of the upper left light beam and a brightness of the upper right light beam, responsive to an oncoming vehicle or a preceding vehicle, or both, being illuminated by the upper left light beam and by the upper right light beam, respectively,
forming the upper left light beam while the leaning vehicle is turning in the left direction, and maintaining the brightness of the formed upper left light beam regardless of whether the oncoming vehicle or the preceding vehicle, or both, are illuminated by the formed upper left light beam, and
forming the upper right light beam while the leaning vehicle is turning in the right direction, and maintaining the brightness of the formed upper right light beam regardless of whether the oncoming vehicle or the preceding vehicle, or both, are illuminated by the formed upper right light beam.

2. The headlight device according to claim 1, wherein the control device is configured to
control the light emission from the headlight while the leaning vehicle is turning in the left direction, to reduce at least one of
a brightness of the lower light beam,
the brightness of the upper central light beam, or
the brightness of the upper right light beam, and
control the light emission from the headlight while the leaning vehicle is turning in the right direction, to reduce at least one of
the brightness of the lower light beam,
the brightness of the upper central light beam, or
the brightness of the upper left light beam.

3. The headlight device according to claim 2, wherein the lower light beam includes
a lower central light beam below the upper central light beam in the upward-downward direction,
a lower left light beam below the upper left light beam in the downward direction and farther in the left direction than the lower central light beam, and
a lower right light beam below the upper right light beam in the downward direction and farther in the right direction than the lower central light beam.

4. The headlight device according to claim 3, wherein the lower left light beam, the lower right light beam, the upper left light beam, and the upper right light beam each include a plurality of sub-light beams that are arranged in the upward-downward direction, and
the control device is configured to control the light emission from the headlight so as to
form the lower central light beam but not the upper central light beam, and
form a left low-beam light beam and a right low-beam light beam in accordance with a lean angle of the vehicle body, the left low-beam light beam and the right low-beam light respectively being
  one of the plurality of sub-light beams of the lower left light beam or of the upper left light beam, and
  one of the plurality of sub-light beams of the lower right light beam or of the upper right light beam,
that are located below a horizontal reference plane and closest to the horizontal reference plane, wherein
the horizontal reference plane is a plane in which an upper boundary of the lower central light beam lies when the vehicle body is upright.

5. A leaning vehicle comprising:
a vehicle body that leans in a left direction when turning in the left direction and leans in a right direction when turning in the right direction; and
the headlight device according to claim 4.

6. A leaning vehicle comprising:
a vehicle body that leans in a left direction when turning in the left direction and leans in a right direction when turning in the right direction; and
the headlight device according to claim 3.

7. A leaning vehicle comprising:
a vehicle body that leans in a left direction when turning in the left direction and leans in a right direction when turning in the right direction; and
the headlight device according to claim 2.

8. The headlight device according to claim 1, wherein the lower light beam includes
  a lower central light beam below the upper central light beam in the upward-downward direction,
  a lower left light beam below the upper left light beam in the downward direction and farther in the left direction than the lower central light beam, and
  a lower right light beam below the upper right light beam in the downward direction and farther in the right direction than the lower central light beam.

9. The headlight device according to claim 8, wherein
the lower left light beam, the lower right light beam, the upper left light beam, and the upper right light beam each include a plurality of sub-light beams that are arranged in the upward-downward direction, and
the control device is configured to control the light emission from the headlight so as to
  form the lower central light beam but not the upper central light beam, and
  form a left low-beam light beam and a right low-beam light beam in accordance with a lean angle of the vehicle body, the left low-beam light beam and the right low-beam light respectively being
    one of the plurality of sub-light beams of the lower left light beam or the upper left light beam, and
    one of the plurality of sub-light beams of the lower right light beam or the upper right light beam,
that are located below a horizontal reference plane and closest to the horizontal reference plane, wherein
the horizontal reference plane is a plane in which an upper boundary of the lower central light beam lies when the vehicle body is upright.

10. A leaning vehicle comprising:
a vehicle body that leans in a left direction when turning in the left direction and leans in a right direction when turning in the right direction; and
the headlight device according to claim 9.

11. A leaning vehicle comprising:
a vehicle body that leans in a left direction when turning in the left direction and leans in a right direction when turning in the right direction; and
the headlight device according to claim 8.

12. A leaning vehicle comprising:
a vehicle body that leans in a left direction when turning in the left direction and leans in a right direction when turning in the right direction; and
the headlight device according to claim 1.

* * * * *

UNITED STATES PATENT AND TRADEMARK OFFICE
CERTIFICATE OF CORRECTION

PATENT NO. : 12,258,091 B2
APPLICATION NO. : 18/646085
DATED : March 25, 2025
INVENTOR(S) : Yumi Kimura and Takehiro Inoue Page 1 of 1

It is certified that error appears in the above-identified patent and that said Letters Patent is hereby corrected as shown below:

On the Title Page

Item (30) Foreign Application Data should read:
Jul. 5, 2019 (JP) PCT/JP2019/026901

Signed and Sealed this
Twenty-seventh Day of May, 2025

Coke Morgan Stewart
*Acting Director of the United States Patent and Trademark Office*